A. C. KLEMME.
AUTOMOBILE LIFTER.
APPLICATION FILED SEPT. 29, 1916.
1,271,584.
Patented July 9, 1918.
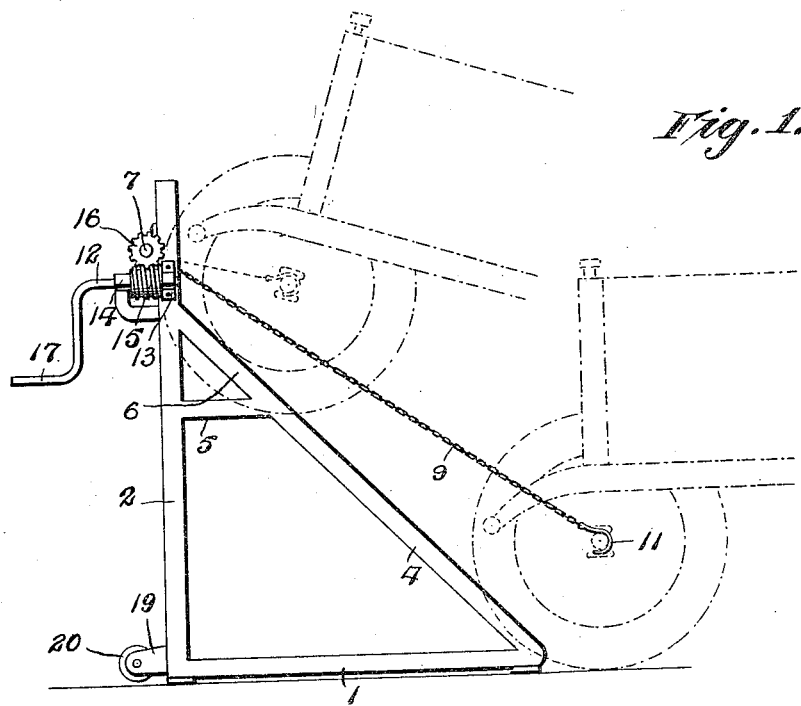
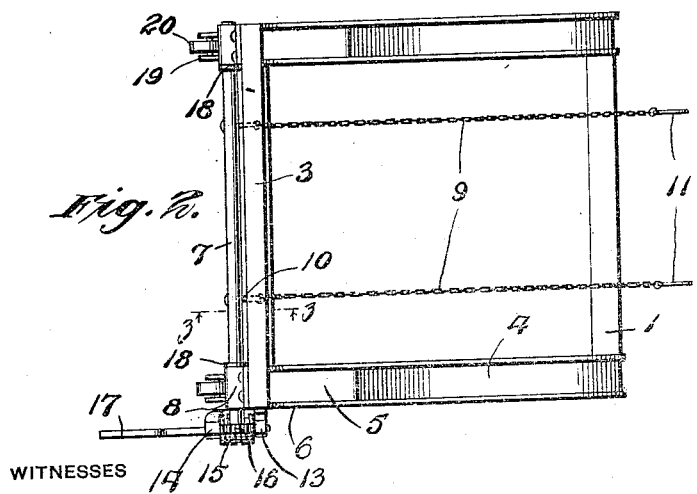
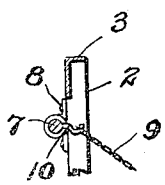
INVENTOR
A. C. Klemme

UNITED STATES PATENT OFFICE.

AL C. KLEMME, OF LEWISTOWN, MONTANA.

AUTOMOBILE-LIFTER.

1,271,584.  Specification of Letters Patent.  Patented July 9, 1918.

Application filed September 29, 1916. Serial No. 122,891.

*To all whom it may concern:*

Be it known that I, AL C. KLEMME, a citizen of the United States, residing at Lewistown, in the county of Fergus and State of Montana, have invented certain new and useful Improvements in Automobile-Lifters, of which the following is a specification.

The present invention has reference, generally, to improvements in lifting devices and the invention relates, more particularly, to a novel automobile lifter.

The invention has for its principal aim and object to provide a device for raising either the front or rear ends of an automobile or other vehicle so that a mechanic will have sufficient room beneath the vehicle to conveniently make repairs thereto.

As an additional and more particular object the present invention embraces the provision of an improved frame, means being windable on the frame to draw one end of the vehicle into a supported position on the frame.

Still further, the invention includes the provision of a frame including inclined tracks and wheel supports for receiving either the front or rear wheels of the vehicle after they have been drawn up the tracks.

A more specific object of the invention resides in the provision of common means whereby the tracks will be braced and whereby accidental movement of the wheels of a vehicle on the wheel supports will be prevented; and also means whereby the device may be readily and conveniently moved from place to place.

Among the other aims and objects of the invention may be recited a provision of a device of the character mentioned with a view to compactness, the number of parts of which are few, the construction simple, the cost of production low and the efficiency high.

Other improvements and novel details in the construction and arrangement of the various parts of the apparatus will be brought out more in detail in the description to follow, which, for a clear understanding of the invention, should be considered in connection with the accompanying drawings, forming a part hereof, and wherein is disclosed, for the purpose of illustration, a convenient and satisfactory embodiment of the invention. It is to be noted, in this connection, that minor changes in the construction and arrangement of the parts may be made without departing from the spirit of the invention or the principle of operation of the various parts.

In the drawings:—

Figure 1 is a side elevation of my invention, the dotted lines showing the front end of an automobile preparatory to and after being raised to a supported position thereon.

Fig. 2 is a top plan of my invention and, Fig. 3 is a transverse section taken on line 3—3 of Fig. 2, in the direction in which the arrows point.

Similar characters of reference are employed in all of the above described views to indicate corresponding parts.

Referring now, more particularly, to the accompanying drawings I provide a frame comprising a rectangular base 1, from one end of which extend spaced parallel standards 2, the latter being connected at the upper ends by means of a cross bar 3. Inclined tracks 4 extend from the opposite end of the base and are arranged in the same planes as the standards. Wheel supports 5 are formed by bending the upper ends of the tracks abruptly. Said wheel supports are connected to the standards and are arranged parallel to the base being preferably channel shaped in cross section as are the tracks. In order to brace the tracks and to prevent transverse movement of vehicle wheels on the supports I have provided spaced bracing bars 6 which extend from the sides of the track to the sides of the standards.

For the purpose of raising the front or rear wheels of an automobile into a supported position on the wheel supports so as to allow a mechanic easy access to the machine in making repairs I have rotatably mounted a transverse shaft 7, the respective ends of the shaft being journaled in bearing brackets 8 carried by the outer surfaces of the supports and in slightly spaced relation with the cross bar 3. Chains 9 have their inner ends connected in spaced relation to the shaft 7 by means of suitable fastening devices 10 while hooks 11 are connected to the outer ends of the chains and are adapted for engagement with the wheel hubs or axles of a vehicle. Now, in order to rotate the shaft I have rotatably mounted another shaft 12 in a plane at right angles to the plane of the axis of the shaft 7, the respective ends of the shaft 12 being journaled in a bearing bracket 13 rigidly connected to the one side of one of the standards 2 and in another bearing bracket 14 extending laterally from the outer face of the same standard. A worm gear 15 is carried on the shaft 12 between the brackets 13 and 14 and meshes with a cog wheel 16 rigidly carried on one of the projecting ends of the shaft 7. A crank handle 17 is formed on the outer end of the shaft 12 and when the handle is rotated the chains are consequently wound on the shaft 7 to raise one end of a vehicle. If desired collars 18 may be arranged on the shaft 7 to prevent longitudinal movement of the shaft.

In order that the frame may be conveniently and readily moved from place to place I have extended spaced bracket arms 19 from each of the standards 2 adjacent the lower ends thereof, rollers 20 being rotatably mounted between the bracket arms 19 and normally arranged in spaced relation with the surface of the ground or floor but adapted to engage the ground when the cross bar 3 is engaged and pulled rearwardly thereby serving as a rotatable supporting means for the frame.

The mode of operation of the invention may be reviewed as follows:—

The hooks 11 carried by the chains 9 are arranged about either the front wheel hubs or the rear axle of an automobile or other vehicle in the manner indicated in dotted lines in Fig. 1 and by rotating the crank handle 17 rotary movement will be imparted to the shaft 7 by means of the worm 15 and the cog 16 which consequently winds the chains 9 about the shaft 7 and at the same time raises the front wheels along the inclined tracks 4 until they rest upon the wheel supports 5. When in this position a mechanic may conveniently make repairs and at the same time be in a comfortable position, at least, more comfortable than was the case before this invention. To lower the automobile it is only necessary to reverse the operation described.

I am aware that changes may be made in the various arrangements and combinations of parts as well as in the details of the construction of the same, without departing from the scope of my present invention, as defined in the appended claim. Hence I do not limit my invention to the exact arrangements and combinations of the devices and parts, as illustrated in the accompanying drawings, and as described in the accompanying specification, nor do I confine myself to the exact details of the constructions of the said parts.

I claim:—

In vehicle lifting means, a base having horizontal base bars, standards extending from one end of said bars, inclined tracks secured at their lower ends to the other end of said base bars and having their upper portions disposed in substantially horizontal planes to form wheel supports, said tracks being further provided with inclined bracing bars at their upper ends formed continuous therewith and secured to the standards, the tracks and bracing bars serving as bracing members for the base bars and standards, and the bracing bars further serving to prevent lateral movement of a vehicle wheel resting upon said wheel support, and means carried by the standards for moving a vehicle upon and up the said tracks.

In testimony whereof I affix my signature in presence of two witnesses.

AL C. KLEMME.

Witnesses:
S. C. WEAVER,
H. H. BOLDT.

Copies of this patent may be obtained for five cents each, by addressing the "Commissioner of Patents, Washington, D. C."